United States Patent
Veregin et al.

(10) Patent No.: US 6,780,559 B2
(45) Date of Patent: Aug. 24, 2004

(54) TONER PROCESSES

(75) Inventors: Richard P. N. Veregin, Mississauga (CA); Raj D. Patel, Oakville (CA); Maria N. V. McDougall, Burlington (CA)

(73) Assignee: Xerox Corporation, Stamford, CT (US)

( * ) Notice: Subject to any disclaimer, the term of this patent is extended or adjusted under 35 U.S.C. 154(b) by 217 days.

(21) Appl. No.: 10/215,148

(22) Filed: Aug. 7, 2002

(65) Prior Publication Data

US 2004/0058268 A1 Mar. 25, 2004

(51) Int. Cl.$^7$ .................................................. G03G 9/08
(52) U.S. Cl. ................................... 430/137.14; 523/335
(58) Field of Search ....................... 430/137.14; 523/335

(56) References Cited

U.S. PATENT DOCUMENTS

| | | | |
|---|---|---|---|
| 5,278,020 A | 1/1994 | Grushkin et al. | 430/137 |
| 5,290,654 A | 3/1994 | Sacripante et al. | 430/137 |
| 5,308,734 A | 5/1994 | Sacripante et al. | 430/137 |
| 5,344,738 A | 9/1994 | Kmiecik-Lawrynowicz et al. | 430/137 |
| 5,370,963 A | 12/1994 | Patel et al. | 430/137 |
| 5,554,471 A | 9/1996 | Bertrand et al. | 430/45 |
| 5,556,727 A | 9/1996 | Ciccarelli et al. | 430/45 |
| 5,591,552 A | 1/1997 | Ciccarelli et al. | 430/45 |
| 5,607,804 A | 3/1997 | Bertrand et al. | 430/106 |
| 5,858,601 A | 1/1999 | Ong et al. | 435/137 |
| 5,916,725 A | 6/1999 | Patel et al. | 430/137 |
| 5,919,595 A | 7/1999 | Mychajlowskij et al. | 430/137 |
| 5,925,488 A | 7/1999 | Patel et al. | 430/137 |
| 5,977,210 A | 11/1999 | Patel et al. | 523/161 |
| 6,268,102 B1 * | 7/2001 | Hopper et al. | 430/137.14 |
| 6,455,219 B1 * | 9/2002 | Chen et al. | 430/137.14 |

* cited by examiner

Primary Examiner—Mark A. Chapman
(74) Attorney, Agent, or Firm—E. O. Palazzo

(57) ABSTRACT

A toner process involving mixing a colorant dispersion and a metal oxide with a latex emulsion comprised of polymer, water, and an anionic surfactant, adding a cationic coagulant followed by heating the mixture to a temperature below about the glass transition temperature (Tg) of the latex polymer particles to provide toner size aggregates comprised of polymer pigment and dye, heating above about the Tg of the polymer and isolating the resulting product.

36 Claims, No Drawings

TONER PROCESSES

REFERENCE TO RELATED PATENTS

In U.S. Pat. Nos. 5,556,727; 5,591,552; 5,554,471; 5,607,804, and 5,620,820, the disclosures of which are totally incorporated herein by reference, there is illustrated for example, a combination of four color toners for the development of electrostatic latent images enabling the formation of a full color gamut image, and wherein the four toners are for example, comprised of a cyan toner, a magenta toner, a yellow toner, and a black toner, each of the toners being comprised of resin and pigment, and wherein the pigment for the cyan toner is a copper phthalocyanine, the pigment for the magenta toner is a xanthene silicomolybdic acid salt of RHODAMINE 6G™ basic dye, the pigment for the yellow toner is a diazo benzidine, and the pigment for the black toner is carbon black. The appropriate components of these patents, such as resins, colorants, and the like, and processes aspects thereof can be selected for the present invention in embodiments thereof.

BACKGROUND

The present invention is generally directed to toner processes, and more specifically, to aggregation and coalescence processes for the preparation of toner compositions. In embodiments there is disclosed the economical in situ chemical preparation of toners without the utilization of the known pulverization and/or classification methods, and wherein in embodiments positively charging pigments are coated with hydrophobic silica particles rendering the pigment particles negatively charging, thereby preventing the toner particles from becoming positively charging in for example, a xerographic development process, and which toners possess in embodiments substantially similar, or the same triboelectrical charging characteristics without the aid of external additives. The toners prepared also possess, for example, an average volume diameter of from about 1 to about 25, and preferably from 2 to about 10 microns, and a narrow GSD (geometric standard deviation) of, for example, from about 1.16 to about 1.26 both as measured on the Coulter Counter. The resulting toners can be selected for known electrophotographic imaging processes, printing processes, including color processes, and lithography.

In embodiments there is illustrated herein toners wherein triboelectric charge sign reversal is substantially prevented, wherein toner surface additives can be avoided or minimized, and wherein there is selected a hydrophobic silica within which the toner colorant, such as pigment and dye for each toner is dispersed and which colorant is water repelling and negative charging, such as silicas like those illustrated herein that have been treated with a hydrophobic agent, including hexamethyldisilazane treated silica, R812S™ available from Degussa, and other similar silicas treated with other hydrophobic agents, including silane and polymer coated silicas. The hydrophobic silica selected for the colorant dispersion in embodiments repels water, therefore it is not water dispersable without the use of a surfactant, and thus cannot be easily removed by washing with water, in contrast to the positive charging pigment itself, which may contain a dye component that is water soluble, and which dye thus can disappear in the washing process in the absence of the hydrophobic silica. Furthermore, the hydrophobic silica selected also enables stable, for example no or little colorant settling, colorant dispersions wherein the colorant diameter size is for example, from about 60 to about 100 manometers as measured on a disc centrifuge, thereby enabling the pigment/dye to be easily dispersed in latex particles. Moreover, in embodiments of the present invention the toners obtained can be comprised of resin and pigment, such as toners each with different pigments, especially those pigments which exhibit positive charging characteristics, such as Rhodamine Pigment Red 81.3, Pigment Violet 3, Pigment Violet 23, Pigment Blue 61 and pigment Green 4, such that the natural positive pigment charge behavior is substantially prevented even though different pigments are selected for each toner, and different concentrations of pigments and dyes contained therein may be present. Moreover, there can be substantially prevented the conversion of the pigment charge to a positive value in a xerographic development system that requires negatively charging toner, and which characteristics can be of value with respect to the generation of full process color copies, such as the generation of developed colored images in the Xerox Corporation 5750®, 5790®, DC2045®, DC2060®, DC12®, and iGEN-3®.

REFERENCES

A number of processes are known for the preparation of toners, such as, for example, conventional processes wherein a resin is melt kneaded or extruded with a pigment, micronized and pulverized to provide toner particles with an average volume particle diameter of from about 9 microns to about 20 microns, and with a broad geometric size distribution of from about 1.3 to about 1.7. In these processes, it is usually necessary to subject the aforementioned toners to a classification procedure such that the geometric size distribution of from about 1.3 to about 1.4 is attained. To obtain a further improved geometric toner size distribution, the toners may need to be further classified, which can result in unsatisfactory toner yields. Generally, during the preparation of toners with average particle size diameters of from about 11 microns to about 15 microns, toner yields range from about 70 percent to about 85 percent after classification. Additionally, during the preparation of smaller sized toners with particle sizes of from about 7 microns to about 11 microns, lower toner yields can be obtained after classification such as from about 50 percent to about 70 percent. In addition, the preparation of toners with conventional processes, where the pigment is positively charging, can evidence reversal of the toner charge from for example, negative to positive in a xerographic development system. With the processes of the present invention in embodiments, for example those containing pigments that are positively charging, such as Pigment Red 81.3, small average particle sizes of, for example, from about 3 microns to about 9 microns, and more specifically about 5 microns, are attained without resorting to classification processes, and wherein narrow geometric size distributions are attained, such as from about 1.16 to about 1.30, and preferably from about 1.16 to about 1.25, high toner yields are also attained, such as from about 90 percent to about 96 percent.

There are illustrated in U.S. Pat. Nos. 5,364,729 and 5,403,693 methods of preparing toner particles by blending together latexes with pigment particles. Also mentioned are U.S. Pat. Nos. 4,996,127; 4,797,339 and 4,983,488. The disclosures of each of these patents are totally incorporated herein by reference.

Emulsion/aggregation/coalescence processes for the preparation of toners are illustrated in a number of Xerox Corporation patents, the disclosures of each of which are totally incorporated herein by reference, such as U.S. Pat. No. 5,290,654; U.S. Pat. No. 5,278,020; U.S. Pat. No. 5,308,734; U.S. Pat. No. 5,370,963; U.S. Pat. No. 5,344,738;

U.S. Pat. No. 5,403,693; U.S. Pat. No. 5,418,108; U.S. Pat. No. 5,364,729; and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,863,698; 5,902,710; 5,910,387; 5,916,725; 5,919,595; 5,925,488; 5,858,601; and 5,977,210. The appropriate components and processes of the above Xerox Corporation patents can be selected for the processes of the present invention in embodiments thereof.

SUMMARY

It is a feature of the present invention to provide toner processes with many of the advantages illustrated herein.

In another feature of the present invention there are provided simple and economical processes for the direct preparation of a set of black and colored toner compositions, including toners with positive charging pigments with for example, excellent pigment dispersions, stable triboelectric charging values, and which toners possess substantially no charging sign reversal on aging.

It is another feature of the present invention to provide a process for obtaining a full set of xerographic color toners having properties such as (a) an excellent color gamut, (b) an acceptable projection efficiency (over about 75 percent and from about 80 to about 95 percent in embodiments), and (c) stable excellent triboelectrical properties. With the toners obtained in accordance with embodiments of the present invention there is enabled the combination of wide color gamut, excellent projection efficiencies, and desired triboelectric toner charge, which charge can remain negative without showing any sign reversal to positive charging on aging. Projection efficiency is essentially a measure of the amount of light transmitted and a measure of the true shade of the color that is transmitted.

In another feature of the present invention there are provided simple and economical in situ processes for the preparation of a set of color toners with hydrophobic silica coated pigment dispersions, and wherein each toner is prepared by an aggregation/coalescence process comprised for example, of (i) utilization of pigment dispersion comprised of pigment, dispersed or ground in a water soluble nonionic surfactant; (ii) preparing a pigment mixture of (i) in water, hydrophobic silica, and other known optional toner additives by shearing or ball milling; (iii) shearing the pigment mixture of (ii) with a latex mixture comprised of a polymer resin, anionic surfactant and nonionic surfactant, with the addition of cationic surfactant, thereby causing a flocculation of the latex particles with pigment particles, which on further stirring allows for the formation of electrostatically stable aggregates of from about 1 to about 10 microns in volume diameter as measured by the Coulter Counter; (iv) adding additional, for example 1 to 10 weight percent of anionic surfactant, to the formed aggregates to, for example, increase their stability and to retain the particle size and particle size distribution during further heating; and (v) coalescing or fusing the aforementioned aggregated mixture by heating.

In a further feature of the present invention there is provided a process for the preparation of a combination of four toner compositions with certain effective particle sizes by controlling the temperature of the aggregation.

In yet a further feature of the present invention there is provided a process for the preparation of a combination of four toners with a particle size distribution which can be improved from about 1.4 to about 1.16 as measured by the Coulter Counter by increasing the temperature of aggregation from about 25° C. to about 45° C.

Moreover, in a further feature of the present invention there is provided a process for the preparation of a combination of four toner compositions which after fixing to paper substrates results in images with a gloss of from about 20 GGU (Gardner Gloss Units) to about 70 GGU as measured by Gardner Gloss meter matching of toner and paper.

In another feature of the present invention there is provided a combination of four toners, each toner being comprised of a composite toner of polymeric resin with colorant and optional additives in high yields of from about 85 percent to about 98 percent by weight of toner without resorting to classification.

In yet another feature of the present invention there are provided toner compositions with low fusing temperatures of from about 140° C. to about 180° C., and with excellent blocking characteristics at from about 50° C. to about 60° C.

Moreover, in another feature of the present invention there are provided toner compositions with a high projection efficiency, such as from about 75 to about 95 percent efficiency as measured by the Match Scan 11 spectrophotometer available from Milton-Roy.

In a further feature of the present invention there are provided toner compositions which result in minimal, low or no paper curl.

Other features disclosed herein reside in providing processes for the preparation of small sized toner particles with a narrow GSD and excellent pigment/dye dispersion by the aggregation of latex particles with pigment particles dispersed in water and a hydrophobic silica, and wherein the aggregated particles of a toner size can then be caused to coalesce by, for example, heating. In embodiments, some factors of interest with respect to controlling particle size and particle size distribution include the concentration of the cationic surfactant, the temperature of the aggregation, the concentration of the polymer component like acrylic acid in the latex, the temperature of coalescence, and the time of coalescence. Further features disclosed include providing toners incorporating a series of pigments containing a dye component, such as reds, blues, yellows, pinks, violets, mixtures thereof of colors, and the like, and pigments that are crystalline such as Pigment Yellow 74, wherein the hydrophobic silica selected provides a coating on the pigment/dye surface, prevents the migration of the dye component with for example, respect to reds, violets and blues, thereby preventing leaching of a color from the toner, preventing or minimizing any loss of color gamut, preventing or minimizing charge sign reversal of the toner; providing toners with excellent high intensity color resolutions, and which toners possess high light transmission allowing from about 70 to about 98 percent of the transmitted light to pass through a fused image on a transparency; providing an in situ process such as emulsion aggregation coalescence for preparing custom color toners by blending different amounts of pigment dispersions, highlight color dye particles and the like, and wherein the pigments are dispersed in water in the presence of hydrophobic silica particles, and when aggregated and coalesced with latex particles require little washing and produce excellent color images when fused; providing processes for the preparation of a combination of four toners comprised of resin pigment containing a dye, and wherein each toner can be of a preselected size, such as from about 1 to about 10 microns in volume average diameter, and with a narrow GSD by the aggregation of latex or emulsion particles, which aggregation can be accomplished by the addition of a cationic surfactant such as alkyl benzyl ammonium chloride with stirring at a temperature in excess of about 25° C., and below about the Tg of the toner resin, for example at 50° C., followed by addition of a stabilizer, for example an anionic surfactant, followed by heating the formed aggregates above about the resin Tg to allow for coalescence.

Aspects of the present invention relate to a toner process comprising: (i) mixing a colorant dispersion comprised of a pigment and a dye, a nonionic water soluble surfactant, and a metal oxide with a latex emulsion comprised of polymer, water, and an anionic surfactant; (ii) adding a cationic coagulant followed by heating the mixture to a temperature below about the glass transition temperature (Tg) of the polymer to provide aggregate particles comprised of the latex, the, pigment and the dye; (iii) optionally adding additional anionic surfactant to stabilize the toner size aggregates particles of (ii) on further heating; and (iv) heating above about the Tg of the polymer to coalesce the aggregates; a process comprising mixing a colorant dispersion, a latex emulsion, a metal oxide, and a cationic coagulant; heating said mixture to a temperature below about the glass transition temperature (Tg) of polymer contained in said latex; followed by heating above about the Tg of the polymer in said latex; and optionally isolating said toner; and a process comprising (i) providing a dispersion containing a pigment and a dye component, a nonionic water soluble surfactant and a metal oxide, mixing with a latex emulsion comprised of polymer particles, water, and an anionic surfactant; (ii) adding a cationic coagulant followed by heating the resulting mixture to a temperature below the glass transition temperature (Tg) of the polymer particles to provide toner size aggregate particles comprised of said polymer latex, said pigment and said dye; (ii) adding anionic surfactant; and (iv) heating above the Tg of the polymer; the generation of stable toners by emulsion/aggregation as illustrated herein and comprising grinding a pigment containing a dye in water in the presence of a hydrophobic silica by ball milling, attrition, or media milling to provide sub-micron pigment particles in the size range of for example, about 0.1 to 0.3 micron, and wherein the silica coating on the pigment particles is about 0.01 to about 0.05 micron in thickness; blending the dispersion obtained with a latex using a mixer, such as an IKA SD41 which allows continuous pumping and shearing at high speeds, and which shearing permits the breaking of initially formed flocks or flocs, to which is then added a cationic surfactant, thus allowing controlled growth of the particles and improved particle size distribution. The pigment/latex blend is then transferred into a kettle equipped with a mechanical stirrer and a temperature probe, and heated at about 45° C. to 50° C. to permit aggregation. Anionic surfactant can be added to stabilize the aggregates during coalescence. The resulting aggregated particles can then be heated to about 20° C. to 50° C. (degrees Centigrade) above their polymer Tg to permit coalescence, and thereafter the resulting particles are filtered and washed with water to remove the surfactants. The toner particles can then be dried in a freeze dryer, spray dryer, or fluid bed dryer.

In embodiments of the present invention there are provided processes for the economical direct preparation of a combination of toners, and wherein each toner is obtained by flocculation or heterocoagulation and coalescence, and wherein the temperature of aggregation can be utilized to control the final toner particle size, that is average volume diameter; processes for the preparation of toner compositions which comprise initially attaining or generating hydrophobic silica coated pigment dispersions, for example an aqueous dispersion mixture of a pigment or pigments, such as Pigment Red 81.3 Pigment Violet 25, Pigment Yellow 74, Pigment Blue 61, Pigment Red 81.1, Pigment Red 81.2, Pigment Red 81.4, Pigment Red 169, Pigment Violet 1, Pigment Violet 2, Pigment Violet 3, Pigment Violet 27, Pigment Violet 39, Pigment Blue 1, Pigment Blue 2, Pigment Blue 14, Pigment Blue 62, Pigment Green 1, Pigment Green 4, having a Color Index (CI) of 45160:1; and wherein the dye component present is Rhodamine 6G, having a Color Index (CI) of 45160:3; Rhodamine 6G, Pigment Red 81.2 having a Color Index (CI) of 45161:1; Basic Red 1:1, Pigment Red 81.3 having a Color Index (CI) of 45161:2; Basic Red 1:1, Pigment Red 81.4 having a Color Index (CI) of 45161:5; Basic Red 1:1, Pigment Red 169 having a Color Index (CI) of 45160:2; Rhodamine 6G, Pigment Violet 1 having a Color Index (CI) of 45170:2; Rhodamine B, Pigment Violet 2 having a Color Index (CI) of 45175:1; Rhodamine 3B ethylester, Pigment Violet 3 having a Color Index (CI) of 42535:2; Methyl Violet, Pigment Violet 27 having a Color Index (CI) of 42535:3; Methyl Violet, Pigment Violet 39 having a Color Index (CI) of 42555:2; Crystal Violet, Pigment Yellow 74 having a Color Index (CI) of 42765:1; Pigment Blue 1 having a Color Index (CI) of 42595:2; Victoria Pure Blue B, Pigment Blue 2 having a Color Index (CI) of 44045:2; wherein the dye component is Victoria Blue 4R, Pigment Blue 14 having a Color Index (CI) of 42600:1; Ethyl Violet, Pigment Blue 61 having a Color Index (CI) of 42765:1; Victoria Blue R, Pigment Blue 62 having a Color Index (CI) of 44084; Victoria Blue R, Pigment Green 1 having a Color Index (CI) of 42040:1; Diamond Green G, Pigment Green 4 having a Color Index (CI) of 42000:2; Malachite Green.

In embodiments, the colorants include known reds, violets, blue, yellow and the like, wherein the colorant is a combination of the pigment and an intermediate dye from which the pigment is derived; the pigment and the dye are in equilibrium with each other wherein the dye can be extracted from the pigment depending on the conditions, for example, the type of solvent, the pH of the medium, and the type of surfactant employed. The colorants employed generally contain about 1 to about 3 percent dye component, such as for example Pigment Red 81.1 having a Color Index (CI) of 45160:1, wherein the dye component is Rhodamine 6G; Pigment Red 81.1 having a Color Index (CI) of 45160:3, wherein the dye component is Rhodamine 6G; Pigment Red 81.2 having a Color Index (CI) of 45161:1, wherein the dye component is Basic Red 1:1; Pigment Red 81.3 having a Color Index (CI) of 45161:2, wherein the dye component is Basic Red 1:1; Pigment Red 81.4 having a Color Index (CI) of 45161:5, wherein the dye component is Basic Red 1:1; Pigment Red 169 having a Color Index (CI) of 45160:2, wherein the dye component is Rhodamine 6G; Pigment Violet 1 having a Color Index (CI) of 45170:2, wherein the dye component is Rhodamine B; Pigment violet 2 having a Color Index (CI) of 45175:1, wherein the dye component is Rhodamine 3B ethylester; Pigment Violet 3 having a Color Index (CI) of 42535:2, wherein the dye component is Methyl Violet; Pigment Violet 27 having a Color Index (CI) of 42535:3, wherein the dye component is Methyl Violet; Pigment Violet 39 having a Color Index (CI) of 42555:2, wherein the dye component is Crystal Violet; Pigment Yellow 74 having a Color Index (CI) of 42765:1, Pigment Blue 1 having a Color Index (CI) of 42595:2, and wherein the dye component is Victoria Pure Blue B; Pigment Blue 2 having a Color Index (CI) of 44045:2, wherein the dye component is Victoria Blue 4R; Pigment Blue 14 having a Color Index (CI) of 42600:1, wherein the dye component is Ethyl Violet; Pigment Blue 61 having a Color Index (CI) of 42765:1, wherein the dye component is Victoria Blue R; Pigment Blue 62 having a Color Index (CI) of 44084, wherein the dye component is Victoria Blue R; Pigment Green 1 having a Color Index (CI) of 42040:1, wherein the dye component is Diamond Green G; Pigment Green 4 having a Color Index (CI) of 42000:2, wherein the dye component is Malachite Green;

C.I.45161:2: Pigment Red 81:3

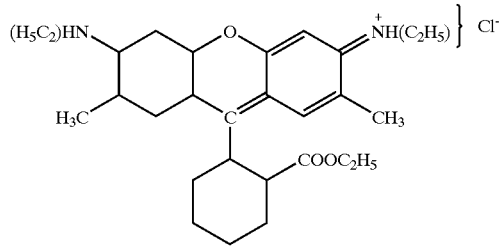

Silicomolybdic acid salt

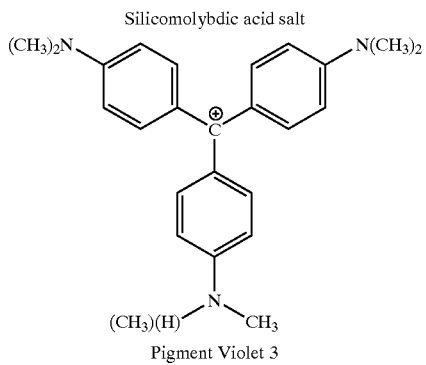

Pigment Violet 3

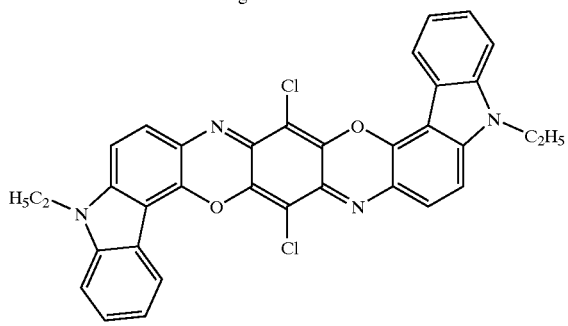

Pigment Violet 23

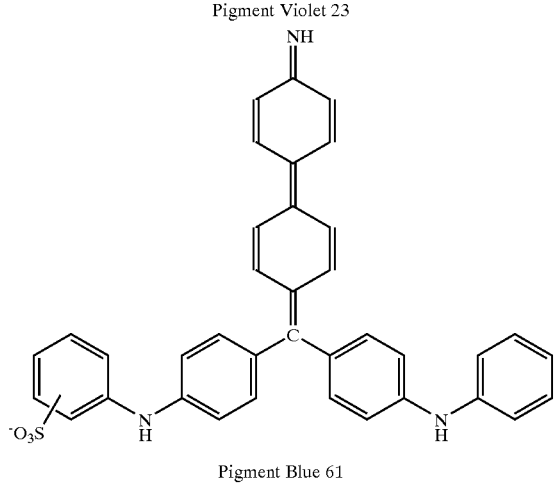

Pigment Blue 61

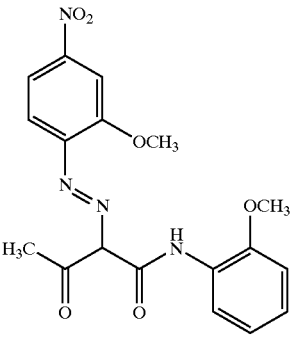

Pigment Yellow 74 and mixtures thereof.

The colorant dispersions can be generated with grinding aids, by known dispersion methods, such as attrition, microfluidization, or high speed homogenization; and more specifically wherein the dispersion is mixed with the latex in the presence of a cationic surfactant, such as benzyl ammonium chloride, and mixed with the latex by utilizing a high shearing device, such as a Brinkmann Polytron, or IKA homogenizer; wherein the latex can be comprised of suspended resin particles, such as poly(styrene butadiene) acrylic acid, poly(styrene-butadiene) beta carboxylic ethyl acrylate, or poly(styrene butylacrylate) beta carboxylic ethyl acrylate, or poly(styrene butylacrylate) acrylic acid, and wherein the particle size of the suspended resin mixture is, for example, from about 0.01 to about 0.5 micron in an aqueous surfactant mixture containing an anionic surfactant, such as sodium dodecylbenzene sulfonate, resulting in a flocculation, or heterocoagulation of the polymer or resin particles with the pigment containing particles, in the presence of a cationic surfactant, such as benzyl ammonium chloride, followed by further stirring of the mixture while heating below about the resin Tg, for example from about 5° C. to about 15° C., and allowing the formation of electrostatically stabilized aggregates ranging from about 0.5 micron to about 10 microns; followed by the addition of extra stabilizer, such as anionic surfactant, subsequently heating above about the resin Tg, for example from about 5° C. to about 500° C., to cause coalescence of the latex, pigment particles, washing with water to remove, for example, surfactants, and drying, such as by use of an Aeromatic fluid bed dryer, freeze dryer, or spray dryer; whereby toner particles comprised of resin and pigment, and optional additives with various particle size diameters can be obtained, such as from about 1 to about 25 microns in average volume particle diameter as measured by the Coulter Counter. Aspects of the present invention can include a process for the preparation of a toner by (i) preparing a pigment dispersion, which dispersion is comprised of a pigment/dye and a nonionic water soluble surfactant to which is added a metal oxide, followed by thoroughly mixing; (ii) shearing the pigment/dye dispersion of (i) with a latex or emulsion blend comprised of submicron resin particles dispersed in water in the presence of an anionic surfactant; (iii) adding to the emulsion/pigment dispersion of (ii) a cationic coagulant followed by heating the mixture to a temperature below the glass transition temperature (Tg) of the latex resin while stirring to form electrostatically bound toner size aggregates; (iv) adding further anionic surfactant to stabilize the toner size aggregates, and to retain the particle size and GSD upon further heating; and (v) heating the toner sized aggregates above the Tg of the resin to coalesce the particles and to provide toner particles with smooth surface morphology, cooling, and washing to enable removal of surfactants; a process for the preparation of a combination of toner compositions comprised of resin and pigment containing dye, optionally wax and other additives, and wherein each toner of the combination is prepared by: (i) preparing a pigment containing dye dispersion in water and hydrophobic silica; (ii) shearing the dispersion with a latex mixture comprised of polymeric or resin particles in water and anionic surfactant, to which is added a cationic surfactant; (iii) heating the resulting sheared mixture below the resin Tg, for example from about 40° C. to about 50° C. (or 5° C. to 20° C. below the resin Tg), thereby causing flocculation or heterocoagulation of the formed particles of pigment, resin and optional additives to form electrostatically bound toner size aggregates; (iv) adding further anionic stabilizer in the amounts of, for example, from about 0.2 to about 5 percent by weight of water to retain the particle size and GSD during (v); and (vi) heating to, for example, from about 60 to about 95° C. the electrostatically bound toner size aggregates of (iii) to form a toner composition comprised of polymeric resin and pigment containing dye; processes for the preparation of a combination of four toner compositions which comprise: (i) preparing a mixture of pigment containing dye, such as carbon black like REGAL 330®, Rhodamine Pigment Red 81.3, Pigment Violet 3, Pigment Violet 23, Pigment Blue 61, Pigment Yellow 74, which are pre dispersed in water and hydrophobic silica, and wherein the pigment loading is from about 2 percent to about 14 percent by weight of toner; (ii) adding the aforementioned pigment mixture to an aqueous suspension of resin particles comprised of, for example, poly(styrene-butylacrylate acrylic acid), and which resin particles are present in various effective amounts, such as from about 40 percent to about 98 percent (or parts) by weight of the toner, and wherein the polymer resin latex particle size is from about 0.07 micron to about 1 micron in volume average diameter, and an anionic surfactant like sodium dodecylsulfate, dodecylbenzene sulfonate or NEOGEN R™ from about 0.5 percent to about 3 percent by weight of water, in the presence of a cationic surfactant available in an amount of from about 0.5 percent to about 2 percent by weight of water, thereby causing a flocculation or heterocoagulation of pigment containing dye, additives and resin particles; (iii) diluting the mixture with water to enable from about 40 percent to about 15 percent of solids; (iv) homogenizing the resulting flocculent mixture with a high shearing device, such as a Brinkmann Polytron or IKA homogenizer, operating at a speed of from about 3,000 revolutions per minute to about 10,000 revolutions per minute for a duration of from about 1 minute to about 10 minutes, thereby resulting in a homogeneous mixture of latex and pigment, and further stirring while heating to below the resin Tg, for example about 5 to 20° C. below the resin Tg at temperatures of about 35 to 50° C., to form electrostatically stable aggregates of from about 1 micron to about 10 microns in average volume diameter; (v) adding additional anionic surfactant or nonionic surfactant in the amount of from 0.5 percent to 5 percent by weight of water to stabilize the aggregates formed in (iv), heating the resultant electrostatically bound aggregate composite particles at from about 60° C. to about 100° C. for a duration of about 60 minutes to about 600 minutes to form toner sized particles of from about 1 micron to about 10 microns in volume average diameter and with a geometric size distribution of from about 1.2 to about 1.3 as measured by the Coulter Counter, and (vi) isolating the toner sized particles by washing, filtering and drying thereby providing toner particles comprised of resin, pigment, and optional additives, such as charge enhancing additives. Flow additives to, for example, further aid the toner flow characteristics and charge additives, if not initially present may then be added by blending with the formed toner, such additives including AEROSIL® or fumed silicas, metal oxides like tin, titanium and the like, metal salts of fatty acids, like zinc stearate, and which additives are each present in various effective amounts, such as from about 0.1 to about 10 percent by weight of the toner.

Illustrative examples of specific resin or polymer particles, resins or polymers selected for the process of the present invention include known polymers such as poly (styrene-butadiene), poly(para-methyl styrene-butadiene), poly(meta-methyl styrene-butadiene), poly(alpha-methyl styrene-butadiene), poly(methylmethacrylate-butadiene), poly(ethylmethacrylate-butadiene), poly (propylmethacrylate-butadiene), poly(butylmethacrylate-butadiene), poly(methylacrylate-butadiene), poly (ethylacrylate-butadiene), poly(propylacrylate-butadiene), poly(butylacrylate-butadiene), poly(styrene-isoprene), poly (para-methyl styrene-isoprene), poly(meta-methyl styrene-isoprene), poly(alpha-methylstyrene-isoprene), poly (methylmethacrylate-isoprene), poly(ethylmethacrylate-isoprene), poly(propylmethacrylate-isoprene) poly (butylmethacrylate-isoprene), poly(methylacrylate-isoprene), poly(ethylacrylate-isoprene), poly (propylacrylate-isoprene), and poly(butylacrylate-isoprene); polymers such as poly(styrene-butadiene-acrylic acid), poly (styrene-butadiene-methacrylic acid). The resin selected, which generally can be in embodiments styrene acrylates, styrene butadienes, or styrene methacrylates, are present in various effective amounts, such as from about 85 weight percent to about 98 weight percent of the toner, and which resin can be of small average particle size, such as from about 0.01 micron to about 1 micron in average volume diameter as measured by the Brookhaven nanosize particle analyzer. Other sizes and effective amounts of resin particles may be selected in embodiments, for example copolymers of polystyrene butylacrylate acrylic acid) or polystyrene butadiene acrylic acid) can be selected as the toner resin.

The resin selected for the process of the present invention can be prepared by emulsion polymerization methods, and the monomers utilized in such processes include styrene, acrylates, methacrylates, butadiene, isoprene, and optionally, but preferably acid or basic olefinic monomers, such as acrylic acid, methacrylic acid, acrylamide, methacrylamide, quaternary ammonium halide of dialkyl or trialkyl acrylamides, or methacrylamide, vinylpyridine, vinylpyrrolidone, vinyl-N-methylpyridinium chloride, and the like. The acid or basic groups can be present in various effective amounts, such as from about 0.1 to about 10 percent by weight of the polymer resin. Known chain transfer agents, for example dodecanethiol, about 1 to about 10 percent, or carbon tetrabromide and the like in effective amounts, such as from about 1 to about 10 percent, can also be selected when preparing the resin particles by emulsion polymerization.

Each of the colorants, such as pigments are present for example, in an amount of from about 2 to about 15 weight percent based on the weight percent of resin and pigment; and wherein each of the magenta, yellow, violet and blue pigments possesses, for example, a diameter particle size or agglomerate diameter size of from about 0.1 micron to about 3 microns; wherein each of the magenta, yellow, violet and blue pigments are of a particle diameter size or agglomerate diameter size of from about 0.01 micron to about 0.3 micron, and the black pigment is of a particle diameter size of from about 0.001 micron to about 0.1 micron; wherein the development of electrostatic latent images enables the formation of a full color images, and wherein the toners are comprised of blue toner, magenta toner, yellow toner, and a black toner, each of said toners being comprised of resin and pigment, and wherein the pigment for the blue toner is PB61, the pigment for the magenta toner is a xanthene silicomolybdic acid salt of Rhodamine 6G basic dye, and the pigment for the yellow toner is a monoazo yellow.

The toner may also include known charge additives in effective amounts of, for example, from 0.1 to 5 weight percent, such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

Examples of metal oxides include the silicas as illustrated herein, and more specifically, include hydrophobic silicas, such as those available from Degussa Corporation, including AEROSIL® R812 and R812S, R8200 according to Degussa Corporation the silica particles treated with hexamethyldisilizane, AEROSIL® R270, R805 and R202 silica all treated according to Degussa Corporation with polydimethylsiloxane, AEROSIL® R972 and R974 silica according to Degussa Corporation treated with a dimethyldichlorosilane, AEROSIL® R104 and R106 silica according to Degussa Corporation treated with octamethylcyclotetrasiloxane, AEROSIL® R805 silica according to Degussa Corporation treated with an octylsilane; also included are hydrophobic treated silicas available from Cabot Corporation, including Cab-O-Sil® TS-530, TG-810G, TG-811F silicas all according to Cabot Corporation treated with hexamethyldisilizane, Cab-O-Sil® TS-610 and T-709F silica according to Cabot Corporation both treated with dimethyldichlorosilane, Cab-O-Sil® TS-720 and TG-308F according to Cabot Corporation both treated with a polydimethylsiloxane polymer, and Cab-O-Sil® TG-820F silica, according to Cabot treated with a proprietary hydrophobic coating; also included are hydrophobic treated silicas available from Wacker-Chemie GmbH, including HDK H1303 VP, according to Wacker-Chemie GmbH treated with an organosiloxane coating, and H2000, H200/4 and H3004 according to Wacker-Chemie GmbH treated with an organosilane coating.

Examples of ionic surfactants include anionic and cationic surfactants with examples of anionic surfactants being, for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, and the like. An effective concentration of the anionic surfactant generally employed is, for example, from about 0.01 to about 10 percent by weight, and preferably from about 0.1 to about 5 percent by weight of monomers used to prepare the copolymer resin particles of the emulsion or latex blend.

Examples of the cationic surfactants, which are usually positively charged, selected for the toners and processes of the present invention include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, and mixtures thereof. This surfactant is utilized in various effective amounts, such as for example from about 0.1 percent to about 5 percent by weight, of water. Preferably, the molar ratio of the cationic surfactant used for flocculation to the anionic surfactant used in the latex preparation is in the range of from about 0.5 to 4, and preferably from 0.5 to 2.

Counterionic surfactants are comprised of either anionic or cationic surfactants as illustrated herein and in the amount indicated, thus, when the ionic surfactant of (i) is an anionic surfactant, the counterionic surfactant is a cationic surfactant.

Examples of surfactants which can be added to the aggregated particles to 'freeze' or retain particle size, and GSD achieved in the aggregation can be selected from anionic surfactants such as sodium dodecylbenzene sulfonate, sodium dodecyinaphthalene sulfate, dialkyl benzenealkyl, sulfates and sulfonates, abitic acid, available from Aldrich, NEOGEN R™, NEOGEN RK™ obtained from Kao, and the like; nonionic surfactants such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhone-Poulenac as IGEPAL CA-21 OTII, IGEPAL CA-52O™, IGEPAL CA-720™, IGEPAL CO-890™, IGEPAL CO-720™, IGEPAL CO-290™, IGEPAL CA-210™, ANTAROX 890™ and ANTAROX 897™, and the like. An effective concentration of the anionic or nonionic surfactant selected as a freezing agent or stabilizing agent is, for example, from about 0.01 to about 10 percent by weight, and preferably from about 0.5 to about 5 percent by weight of the total weight of the aggregates comprised of resin latex, pigment particles, water, ionic and nonionic surfactants mixture.

Developer compositions can be prepared by mixing the toners illustrated herein with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

The following Examples are being submitted to illustrate various species of the present invention. These Examples are intended to be illustrative only and are not intended to limit the scope of the present invention. Also, parts and percentages are by weight unless otherwise indicated.

EXAMPLES

Latex Synthesis

A polymeric or emulsion latex was prepared by the emulsion polymerization of styrene/butylacrylate/acrylic acid (82/18/2 parts) in a nonionic/anionic surfactant solution (3 percent) as follows. 656 Grams of styrene, 144 grams of butyl acrylate, 16 grams of acrylic acid, 28 grams (3.5 percent) of dodecanethiol, and 8 grams of carbon tetrabromide were mixed with 1,100 milliliters of deionized water in which 18 grams of anionic surfactant (sodium dodecyl benzene sulfonate—NEOGEN R™) containing contains 60 percent of active component), 17.2 grams of polyoxyethylene nonyl phenyl ether, a nonionic surfactant (ANTAROX 897™—70 percent active), and 8 grams of ammonium persulfate initiator were dissolved in 100 grams of water, and was added to the above latex mixture. The emulsion was then polymerized at 70° C. for 6 hours. The resulting latex was comprised of 60 percent water and 40 percent (weight percent throughout) solids of a copolymer of polystyrene/polybutyl acrylate/polyacrylic acid, 88/12/2; the Tg of the latex dry sample was 60° C., as measured on a DuPont DSC; $M_w$=24,500, and $M_n$=6,000 as determined on a Hewlett Packard GPC. The zeta potential was measured on Pen Kem Inc. The Laser Zee Meter value was 23 millivolts for this polymeric latex. The particle size of the latex resin as measured on Brookhaven BI-90 Particle Nanosizer was 136 manometers.

Toner Preparation

Example I (PR 81.3)

A pigment solution containing 45 grams of a pigment Red 81.3 aqueous dispersion which contained 43.8 weight percent solids and 2 weight percent of a nonionic surfactant (a polyoxyethylene nonphenyl ether) where the solids comprise 98 weight percent of pigment and 2 weight percent of RHODAMINE 6G™ dye, the dispersion being obtained from Sun Chemicals, 200 grams of water, and 9.8 grams of 7 nanometers particle size R812S hydrophobic silica coated with hexamethyldisilizane obtained from Degussa, which corresponds to 28 weight percent of silica per weight percent of pigment, was roll milled overnight, about 20 hours, to incorporate the silica into the pigment particles. The amount of silica was calculated to give an approximate total 100 percent coverage of the pigment particles surface. The pigment solution was then blended together with 460 grams of the above anionic latex (40 percent solids), where the latex resin was comprised of styrene/butylacrylate/acrylic acid. To this latex/pigment mixture were added 2 grams of the cationic surfactant (SANIZOL B™—dialkyl benzenealkyl ammonium chloride) which was then aggregated at a temperature of 50° C. resulting in a particle size of 6.7 microns with a GSD of 1.18. 15 Milliliters of a 20 percent by weight concentration of anionic stabilizer (sodium dodecylbenzene sulfonate) was then added to the aggregated particles and the temperature of the reactor was raised to 93° C. for a period of 3 hours resulting in a particle size of 6.8 microns with a GSD of 1.20. The overall content of the silica was 1.4 weight percent based on the weight percent of the toner. The toner was then washed with a 9:1 ratio of water to toner at a pH of 8.5 where the pH was only adjusted for the first wash, and subsequently only water washes were accomplished. At each wash the water was collected and examined. The first wash showed a slight tint of color, however, the remaining washes showed the absence of dye or pigment. The toner was then dried and its charging were evaluated as illustrated below. The toner product obtained was comprised of 95 weight percent of styrene butylacrylate acrylic acid and 5 weight percent of Pigment Red 81.3.

Example II (PV 23)

A pigment solution containing 14.3 grams of Violet 3 aqueous dispersion which contained 43.8 weight percent solids and 2 percent by weight of the nonionic surfactant (a polyoxyethylene nonyphenyl ether) where the solids are comprised of 98.5 percent pigment and 1.5 percent Methyl Violet dye and which dispersion was obtained from Sun Chemicals, 200 grams of water, and 4 grams of 7 nanometers particle size R812S hydrophobic silica coated with hexamethyldisilizane obtained from Degussa, which corresponds to 28 weight percent of silica per weight percent of pigment, was roll milled overnight, about 18 to 20 hours to primarily incorporate the silica into the pigment particles. The amount of silica was calculated to give an approximate total coverage of the pigment particles surface. The aforementioned pigment solution was then blended together with 460 grams of the anionic latex (40 percent solids), where the latex resin was comprised of styrene/butylacrylate/acrylic acid. To this latex/pigment mixture were added 2 grams of cationic surfactant (SANIZOL B™—dialkyl benzenealkyl ammonium chloride) which was then aggregated at a temperature of 50° C. resulting in a particle size of 6.3 microns with a GSD of 1.20. 15 Milliliters of a 20 percent by weight concentration of anionic stabilizer (sodium dodecylbenzene sulfonate) was then added to the aggregated particles and the temperature of the reactor was increased to 93° C. and retained at this temperature for a period of 4 hours resulting in toner particles with a size diameter of 10 microns and a GSD of 1.21. The overall content of the silica was only 0.98 weight percent per weight percent of toner. The toner was then washed with a 9:1 ratio of water to toner at a pH of 8.5 where the pH was only adjusted for the first wash, and subsequently only water washes were accomplished. At each wash the water was collected and examined. The first wash showed a slight tint of color. However, the remaining washes showed no dye or pigment present. The toner was dried and its charging was evaluated. The toner product was comprised of 96.5 weight percent of styrene butylacrylate acrylic acid and 3.5 weight percent of the Pigment Violet 23.

Example III (PB 61)

A pigment solution containing 45.6 grams of Pigment Blue 61 aqueous dispersion which contained 39 weight percent solids and 2 percent by weight percent of the nonionic surfactant (a polyoxyethylene nonyphenyl ether) where the solids contain 98 weight percent of pigment and 2 weight percent of Victoria Blue R dye and which dispersion was obtained from Sun Chemicals, 200 grams of water, and 12.8 grams of 7 nanometers particle size R812S hydrophobic silica coated with hexamethyldisilizane obtained from Degussa, which corresponds to 28 weight percent of silica per weight percent of pigment, was roll milled overnight, about 18 to 20 hours to primarily incorporate the silica into the pigment particles. The amount of silica was calculated to give an approximate total coverage of the pigment particles surface. The aforementioned pigment solution was then blended together with 460 grams of the anionic latex (40 percent solids), where the latex resin was comprised of styrene/butylacrylate/acrylic acid. To this latex/pigment mixture was added 2.0 grams of the cationic surfactant (SANIZOL B™ dialkyl benzenealkyl ammonium chloride) which was then aggregated at a temperature of 50° C. resulting in a particle size 6.8 microns with a GSD of 1.19. 15 Milliliters of a 20 percent by weight concentration of anionic surfactant (NEOGEN R™—sodium dodecylbenzene sulfonate) was then added to the aggregated particles to prevent any further growth and the temperature of the reactor was raised to 93° C. and retained at this temperature for a period of 4 hours. The resultant product particle size was 7 microns with a GSD of 1.21. The overall content of the silica was only 2.38 weight percent per weight percent of the toner product. The toner was then washed with a 9:1 ratio of water to toner at a pH of 8.5 where the pH was only adjusted for the first wash, and subsequently only water washes were is carried out. At each wash the water was collected and examined. The first wash showed a slight tint of color. However, the remainder washes showed no dye or pigment present, which indicates that most of the dye was retained in the pigment containing toner particles. The toner was then dried and its charging was evaluated. The toner was comprised of 91.5 weight percent of styrene butylacrylate acrylic acid and 8.5 weight percent of Pigment Blue 61.

Example IV (PY 74)

A pigment solution containing 35 grams of pigment PY 74 aqueous dispersion which contained 37.5 weight percent solids and 2 weight percent of nonionic surfactant (a polyoxyethylene nonyphenyl ether) and obtained from Sun Chemicals, 200 grams of water, and 9.8 grams of 7 nanometers particle size R812S hydrophobic silica coated with hexamethyldisilizane obtained from Degussa, which corresponds to 28 weight percent of silica per weight percent of pigment, was roll milled overnight in order to incorporate the silica on to the pigment particles. The amount of silica was calculated to give an approximate 100 percent total coverage of the pigment particles surface. The pigment solution was then blended together with 390 grams of the anionic latex (40 percent solids), where the latex resin was comprised of styrene/butylacrylate/acrylic acid. To the latex/pigment mixture was added 1.5 grams of cationic surfactant SANIZOL B™—dialkyl benzenealkyl ammonium chloride) which was then aggregated at a temperature of 50° C. resulting in a toner particle size of volume average diameter throughout of 6 microns with a GSD of 1.17. 15 Milliliters of a 20 percent by weight concentration of anionic surfactant (sodium dodecylbenzene sulfonate—NEOGEN R™) were then added to the aggregated particles to prevent any further growth and the temperature of the reactor was increased to 93° C. and retained at this temperature for a period of 4 hours. The resultant toner particle size was 6.2 microns with a GSD of 1.18. The overall content of the silica was only 2.24 weight percent per weight percent toner. The toner was then washed with a 9:1 ratio of water to toner at a pH of 8.5 where the pH was only adjusted for the first wash, and subsequently only water washes were carried out. At each wash the water was collected and examined. The first wash showed no signs of pigment rejection, which indicates that no pigment was removed from out of the particles despite the crystalline nature of the pigment. The toner was dried and its charging was evaluated. The toner was comprised of 92 weight percent of styrene butylacrylate acrylic acid and 8 weight percent of the Pigment Blue 61.

Comparative Example I (PR 81.3)

A pigment solution containing 45 grams of a Pigment Red 81.3 aqueous dispersion which contained 43.8 weight percent solids and 2 weight percent of the nonionic surfactant polyoxyethylene nonyphenyl ether where the solids are comprised of 98 weight percent of pigment and 2 weight percent of RHODAMINE 6G™ dye and which dispersion was obtained from Sun Chemicals, 200 grams of water. This pigment solution was then blended together with 460 grams of the anionic latex (40 percent solids), where the latex resin was comprised of styrene/butylacrylate/acrylic acid. To this latex pigment mixture were added 2 grams of the cationic surfactant (dialkyl benzenealkyl ammonium chloride—SANIZOL B™) which latex was then aggregated at a temperature of 50° C. resulting in a particle size diameter of 6.5 microns with a GSD of 1.19. 15 Milliliters of a 20 percent by weight concentration of anionic stabilizer (sodium dodecylbenzene sulfonate—NEOGEN R™) were then added to the aggregated particles and the temperature of the reactor raised to 93° C. and retained at this temperature for a period of 3 hours and where the resultant toner particle size diameter was 6.6 microns with a GSD of 1.20. The toner was then washed with a 9:1 ratio of water to toner at a pH of 8.5 where the pH was only adjusted for the first wash, and subsequently only water washes were carried out. At each wash the water was collected and examined. All four washes showed signs of delacking of the dye in the filtrate. The toner was dried and its charging was evaluated. The toner was comprised of 95 weight percent of styrene butylacrylate acrylic acid and 5 weight percent of the Pigment Red 81.3.

Toner Triboelectric Charge Evaluation

In 120 milliliter glass bottles, 1 gram of each of the above prepared toners was added to 24 grams of carrier particles comprised of 65 micron steel particles coated with a mixture of 20 percent by weight of Vulcan carbon black and 80 weight percent of polymethylmethacrylate, coating weight of 1 percent. For each combination of toner and carrier, the above developer mixture was retained in an environanometersental chamber at 50 percent relative humidity overnight, about 16 hours. The bottles were then sealed, and the toner and carrier particles were mixed by a paint shaker; samples were removed at 5 minutes, 15 minutes, 30 minutes, 60 minutes and 180 minutes. The paint shaker mixing simulates a very aggressive developer aging as might occur in a xerographic developer housing under stressful conditions. The toner charge for each sample was measured using the known standard total blow-off processes to obtain the q/m for the toner in microCoulombs per gram ($\mu$C/g) and a standard charge spectrograph to obtain the q/d for the toner in femtoCoulombs per micron (fC/$\mu$m). The desired outcome is that both the q/m and q/d remain negatively charging with aging, and shown no sign reversal, with both the q/m and q/d remaining negative with aging.

The results of the charge aging for the toner containing PR81.3 coated with hydrophobic silica, and the comparative toner containing PR81.3 without any silica, are shown in Table I. Pigment Red 81.3 (Example I) coated with R812S hydrophobic silica, the toner charge remains negative to 180 minutes, showing no sign reversal with this very aggressive aging. Comparative Example I containing Pigment Red 81.3 with no silica coating shows an initial negative charge which becomes positive after 60 minutes of aging. The results of this test indicate that hydrophobic silica coating of pigments contain a dye component, as illustrated herein, and which is effective to prevent the sign reversal of the toner charge on aging, as would occur in a xerographic housing. Tables II and III illustrate the q/m and q/d respectively with aging time. Table III illustrates the aging of the q/m charge in $\mu$C/g of the toners of Examples II, III and IV, containing a silica coated pigment, PV 3, PB 61 and PY 74, respectively. All toners with silica coated pigments show negative charge at the end of the aging test, with no reversal of the sign of the charge.

TABLE I

| Example | Description | Toner Charge (q/m in $\mu$C/g) with Aging Time (minutes) | | | | |
|---|---|---|---|---|---|---|
| | | 5 | 15 | 30 | 60 | 180 |
| Example I | 5% PR81.3 coated with 28% R812S | −13.2 | −11.1 | −9.0 | −7.1 | −3.3 |
| Comparative Example I | 5% PR81.3 | −12.5 | −7.3 | −4.5 | −2.0 | +2.2 |

TABLE II

| Example | Description | Toner Charge (q/d in fC/mm) with Aging Time (minutes) | | | | |
|---|---|---|---|---|---|---|
| | | 5 | 15 | 30 | 60 | 180 |
| Example I | 5% PR81.3 coated with 28% R812S | −0.22 | −0.22 | −0.21 | −0.18 | −0.10 |

TABLE III

| Example | Description | Toner Charge (q/m in $\mu$C/g) with Aging Time (minutes) | |
|---|---|---|---|
| | | 5 | 180 |
| Example II | 3.5% PV 23 coated with 28% R812S | −14.2 | −8.7 |
| Example III | 8.5% PB61 coated with 28% R812S | −16.7 | −7.4 |
| Example IV | 8% PY74 coated with 28% R812S | −8.9 | −5.8 |

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A toner process comprising:
   (i) mixing a colorant dispersion comprised of a pigment and a dye, a nonionic water soluble surfactant, and a metal oxide with a latex emulsion comprised of polymer, water, and an anionic surfactant;
   (ii) adding a cationic coagulant followed by heating the mixture to a temperature below about the glass transition temperature (Tg) of said polymer to provide aggregate particles comprised of said latex, said pigment and said dye;
   (iii) optionally adding additional anionic surfactant to stabilize the toner size aggregate particles of (ii) on further heating; and
   (iv) heating above about the Tg of said polymer to coalesce said aggregates.

2. A toner process in accordance with claim 1 comprising:
   (i) adding to said colorant dispersion said metal oxide;
   (ii) shearing said colorant dispersion of (i) with said latex;
   (iii) adding said emulsion/colorant dispersion blend of (ii) to said cationic coagulant followed by heating the resulting mixture to a temperature below the glass transition temperature (Tg) of said polymer to form electrostatically bound toner size aggregates;
   (iv) adding said anionic surfactant in an amount of from about 1 to about 10 weight percent by weight of toner to primarily stabilize the toner size aggregates, and to retain the toner aggregate size;
   (v) heating said aggregates above the Tg of the polymer to coalesce said polymer and said colorant and wherein there is provided toner particles with a substantially smooth surface morphology; and
   (vi) cooling and washing to enable removal of said surfactants.

3. A process in accordance with claim 2 wherein the pigment is present in an amount of about 2 to about 20 weight percent based on the polymer weight.

4. A process in accordance with claim 2 wherein the size of said aggregates are increased from a diameter of about 0.2 to about 0.5 microns to from about 2.5 to about 10 microns by increasing the temperature of heating in (iii) to from about room temperature, about 22 to about 26° C., to about 50° C.

5. A process in accordance with claim 2 wherein the particle size distribution of the aggregated particles becomes narrower, from about 1.40 decreasing to about 1.16, when the temperature is increased from below said polymer Tg to about 50° C.

6. A process in accordance with claim 2 wherein the heating of the blend of latex, colorant, and surfactants is accomplished at a temperature of from about 20° C. to about 5° C. below the Tg of the polymer, and wherein said heating is for an optional period of from about 0.5 hour to about 6 hours, and wherein there is further added toner additives in (iii).

7. A process in accordance with claim 1 wherein the colorant dispersion comprises submicron colorant particles of a diameter size of about 80 to about 300 nanometers dispersed in water, a nonionic surfactant and submicron metal oxide particulates of a diameter of about 3 to about 30 nanometers.

8. A process in accordance with claim 1 wherein said metal oxide is silica.

9. A process in accordance with claim 1 wherein said metal oxide is a hydrophobic silica.

10. A process in accordance with claim 1 wherein said metal oxide is a silica treated with hexamethyldisilizane, polydimethylsiloxane, dimethyldichlorosilane, octamethylcyclotetrasiloxane, or octylsilane.

11. A process in accordance with claim 1 wherein said metal oxide is a silica coated with hexamethyldisilizane, polydimethylsiloxane, dimethyldichlorosilane, octamethylcyclotetrasiloxane, octylsilane, an organosiloxane, or alternatively an organosilane, and which coated silica is present in an amount of about 15 to about 30 weight percent by weight of said pigment and said coating on said colorant of pigment and dye is about 5 to about 30 nanometers in thickness.

12. A process in accordance with claim 1 wherein said colorant is coated with said metal oxide, and wherein the coating thickness is from about 0.02 to about 0.1 microns.

13. A process in accordance with claim 1 wherein the metal oxide is from about 7 to about 50 nanometers in diameter.

14. A process in accordance with claim 1 and wherein the toner resulting is comprised of polymer and colorant coated with said metal oxide and optionally wherein said metal oxide coating prevents or minimizes delaking, bleeding, or migration into the aqueous phase of the dye component present in the colorant.

15. A process in accordance with claim 1 wherein said colorant is coated with said metal oxide to thereby minimize or prevent electrical triboelectrical charge reversal.

16. A process in accordance with claim 1 wherein said colorant contains a dye coated with a hydrophobic silica thereby enabling the substantially complete incorporation of said dye into said toner.

17. A process in accordance with claim 1 wherein the metal oxide is present in an amount of about 15 to about 40 weight percent by weight of colorant and said colorant is present in an amount of from about 85 to about 60 percent and wherein the total thereof is about 100 percent.

18. A process in accordance with claim 1 wherein said colorant is a pigment and wherein said pigment contains a water soluble dye.

19. A process in accordance with claim 1 wherein the cationic surfactant is selected in an amount of from about 0.5 to about 10 weight percent by weight of toner.

20. A process in accordance with claim 1 wherein said heating in (iv) is accomplished at a temperature of from about 10° C. to about 95° C. above the Tg of the polymer.

21. A process in accordance with claim 1 wherein said polymer is selected from the group consisting of poly (styrene-butadiene), poly(para-methylstyrene-butadiene), poly(meta-methylstyrene-butadiene), poly(alpha-methylstyrene-butadiene), poly(methylmethacrylate-butadiene), poly(ethylmethacrylate-butadiene), poly(propylmethacrylate-butadiene), poly(butylmethacrylate-butadiene), poly(methylacrylate-butadiene), poly(ethylacrylate-butadiene), poly(propylacrylate-butadiene), poly(butylacrylate-butadiene), poly(styrene-isoprene), poly(para-methylstyrene-isoprene), poly(meta-methylstyrene-isoprene), poly(alpha-methylstyrene-isoprene), poly(methylmethacrylate-isoprene), poly(ethylmethacrylate-isoprene), poly(propylmethacrylate-isoprene), poly(butylmethacrylate-isoprene), poly(methylacrylate-isoprene), poly(ethylacrylate-isoprene), poly(propylacrylate-isoprene), and poly(butylacrylate-isoprene).

22. A process in accordance with claim 1 wherein said polymer is selected from the group consisting of poly (styrene-butadiene-acrylic acid), poly(styrene-butadiene-methacrylic acid), poly(styrene-butylmethacrylate-acrylic acid), poly(styrene-butylacrylate-acrylic acid), polyethylene-terephthalate, polypropylene-terephthalate, polybutylene-terephthalate, polypentylene-terephthalate, polyhexalene-terephthalate, polyheptadene-terephthalate, polystyrene-butadiene, and polyoctalene-terephthalate.

23. A process in accordance with claim 1 wherein the anionic surfactant is selected from the group consisting of sodium dodecyl sulfate, sodium dodecylbenzene sulfate and sodium dodecyinaphthalene sulfate in an amount of from about 1 to about 10 weight percent by weight of toner.

24. A process in accordance with claim 1 wherein said cationic surfactant is a quaternary ammonium salt.

25. A process in accordance with claim 1 wherein the polymer utilized in (ii) is from about 0.03 to about 0.08 micron in average volume diameter; and wherein the pigment/dye particles are from about 0.01 to about 0.08 micron in volume average diameter.

26. A process in accordance with claim 1 wherein the toner particles isolated are from about 2 to about 15 microns in average volume diameter.

27. A process comprising mixing a colorant dispersion, a latex emulsion, a metal oxide, and a cationic coagulant; heating said mixture to a temperature below about the glass transition temperature (Tg) of polymer contained in said latex; followed by heating above about the Tg of the polymer in said latex; and optionally isolating said toner.

28. A process comprising:
  (i) providing a dispersion containing a pigment and a dye component, a nonionic water soluble surfactant and a metal oxide, mixing with a latex emulsion comprised of polymer particles, water, and an anionic surfactant;
  (ii) adding a cationic coagulant followed by heating the resulting mixture to a temperature below the glass transition temperature (Tg) of the polymer particles to provide toner size aggregate particles comprised of said polymer latex, said pigment and said dye;
  (iii) adding anionic surfactant; and
  (iv) heating above the Tg of the polymer.

29. A process in accordance with claim 28 wherein there is isolated a toner subsequent to cooling after said (iv) heating.

30. A process in accordance with claim 1 wherein said metal oxide is a silica coated with an organosiloxane.

31. A process in accordance with claim 1 wherein said metal oxide is a silica coated with hexamethyldisilizane.

32. A process in accordance with claim 1 wherein said metal oxide is comprised of a silica core and thereover a coating of polydimethylsiloxane, dimethyldichlorosilane, octamethylcyclotetrasiloxane, octylsilane, or dimethyldichlorosilane.

33. A process in accordance with claim 32 wherein said coating is present in an amount of about 15 to about 30 weight percent by weight of pigment.

34. A process in accordance with claim 32 wherein said coating is present in an amount of about 20 to about 30 weight percent by weight of pigment and the silica size diameter is from about 3 to about 15 nanometers in size.

35. A process in accordance with claim 1 wherein said pigment is present in an amount of from about 1 to about 99 weight percent; said dye is present in an amount of from about 99 to about 1 weight percent and the total of said pigment and dye is about 100 percent.

36. A toner process consisting essentially of:
  (i) mixing a colorant dispersion comprised of a pigment and a dye, a nonionic water soluble surfactant, and a metal oxide with a latex emulsion comprised of polymer, water, and an anionic surfactant;
  (ii) adding a cationic coagulant followed by heating the mixture to a temperature below about the glass transition temperature (Tg) of said polymer to provide aggregate particles comprised of said latex, said pigment and said dye;
  (iii) optionally adding additional anionic surfactant to stabilize the toner size aggregate particles of (ii) on further heating; and
  (iv) heating above about the Tg of said polymer to coalesce said aggregates.

* * * * *